(12) United States Patent
Lee et al.

(10) Patent No.: US 8,155,483 B2
(45) Date of Patent: Apr. 10, 2012

(54) APPARATUS FOR AND METHOD OF MEASURING IMAGE

(75) Inventors: Sang-yoon Lee, Daejeon (KR); Min-gu Kang, Daejeon (KR); Ssang-gun Lim, Daejeon (KR)

(73) Assignee: Intekplus Co., Ltd., Daejeon (KR)

( * ) Notice: Subject to any disclaimer, the term of this patent is extended or adjusted under 35 U.S.C. 154(b) by 1028 days.

(21) Appl. No.: 12/090,592

(22) PCT Filed: Oct. 18, 2006

(86) PCT No.: PCT/KR2006/004225
§ 371 (c)(1),
(2), (4) Date: Apr. 17, 2008

(87) PCT Pub. No.: WO2007/046626
PCT Pub. Date: Apr. 26, 2007

(65) Prior Publication Data
US 2008/0260204 A1   Oct. 23, 2008

(30) Foreign Application Priority Data
Oct. 19, 2005  (KR) .................. 10-2005-0098853

(51) Int. Cl.
*G06K 9/20* (2006.01)
(52) U.S. Cl. .................. 382/312; 382/282; 382/286
(58) Field of Classification Search .................. 382/291, 382/307, 317, 282, 286, 312
See application file for complete search history.

(56) References Cited

U.S. PATENT DOCUMENTS

| | | | | |
|---|---|---|---|---|
| 5,748,904 A | * | 5/1998 | Huang et al. | 345/544 |
| 5,793,371 A | * | 8/1998 | Deering | 345/418 |
| 5,835,244 A | * | 11/1998 | Bestmann | 358/523 |
| 5,926,647 A | * | 7/1999 | Adams et al. | 712/36 |
| 5,936,726 A | * | 8/1999 | Takeda et al. | 356/237.2 |
| 5,978,102 A | * | 11/1999 | Matsuda | 358/474 |
| 6,065,746 A | * | 5/2000 | Tranquilla | 271/176 |
| 6,208,416 B1 | * | 3/2001 | Huntley et al. | 356/606 |
| 6,552,806 B1 | * | 4/2003 | Swinford et al. | 356/512 |

FOREIGN PATENT DOCUMENTS

| | | |
|---|---|---|
| JP | 4 295709 | 10/1992 |
| JP | 2002 214129 | 7/2002 |
| KR | 10 2003 0056971 | 7/2003 |
| WO | 2004 070316 | 8/2004 |

OTHER PUBLICATIONS

U.S. Appl. No. 12/090,557, filed Apr. 17, 2008, Lee, et al.

* cited by examiner

*Primary Examiner* — Yosef Kassa
(74) *Attorney, Agent, or Firm* — Kile Park Goekjian Reed & McManus PLLC

(57) ABSTRACT

An image measuring apparatus for enhancing an accuracy of an image captured by an optical system and a method thereof are disclosed. The apparatus includes a CCD camera for capturing the object and outputting the captured image, a lamp for generating white light to illuminate a capturing area of the object, an illumination controller for controlling the lamp to be turned on, a piezoelectric actuator for controlling a minute height of the optical system with respect to the object, an image capturing device for acquiring the image captured by the CCD camera, a driving signal generator for outputting a driving signal to the illumination controller and the piezoelectric actuator when an enable signal is generated from the CCD camera, and an image signal processor for estimating height information of the object from data transmitted from the image capturing unit.

4 Claims, 5 Drawing Sheets

APPARATUS FOR AND METHOD OF MEASURING IMAGE

BACKGROUND OF THE INVENTION

1. Field of the Invention

The present invention relates to an optical image measuring apparatus and a method of optically measuring an image, and particularly to, an image measuring apparatus for enhancing an accuracy of an image captured by an optical system and a method thereof.

2. Description of the Related Art

Electronic and mechanical components are vigorously being required to be made smaller and more accurate, and in order to check processing and manufacturing statuses of the small electronic and mechanical components, their sizes, shapes, and surface illuminance must be measured very precisely.

For example, sizes, shapes, laser marked statuses, and surface illuminance of an electronic component, that is, a semiconductor wafer and a micro-pattern of an integrated circuit fabricated on the semiconductor wafer cannot be measured by a conventional contact-type measuring apparatus. Moreover, in a case of using a contact-type surface illuminance measuring apparatus using a contact probe, a tip of the contact probe generates fine scratches on a surface of an object to be measured and it is hard to acquire information about an area thereof.

In order to solve the above problems, a 2-dimensional measuring apparatus and a method thereof and a 3-dimensional measuring apparatus and a method thereof, that use an optical microscope, have been developed to measure the shape of the object to be measured by projecting light emitted from a light source to the object to be measured according to a reference pattern and comparing the reference pattern with light modified due to the shape of the object.

There is proposed a method using white-light scanning interferometry (hereinafter, referred to as "WSI") as the three-dimensional image measuring method using the microscope.

Generally, interference means a phenomenon that brightness is increased or decreased when two light beams are overlapped, and the WSI is a method of driving a micro-actuator, for example, a piezoelectric actuator to acquire an image while traveling on a reference plane so as to find an area where an interference pattern exists and after that to acquire a surface illuminance by finding a position where a visibility is maximal so that the three-dimensional image is measured.

FIG. 5 is a block diagram illustrating a process of acquiring an image in a conventional optical shape measuring apparatus.

The conventional shape measuring apparatus include a CCD camera 100 to take an image of an object and to output the image when a trigger signal is inputted from an image capturing device 205 that is described later, a plurality of lamps 400 installed at different places to adjust surface illuminance of parts of the object to be tested, and an illuminating controller 300 to control the plural lamps 400. The illuminating controller 300 controls the lamps 400 according to the trigger signal generated by the image capturing device 205 that is installed in a computer 200.

Meanwhile, the image capturing device 205 installed in the computer 200 performs a function of capturing the image outputted from the CCD camera 100 and transmitting the image to an image signal processor 207. The image capturing device 205 generates and outputs a trigger signal to synchronize the illuminating controller 300 and the CCD camera 100 and captures the image outputted from the CCD camera 100.

In this way, a plurality of heights in a scanning area of the object P is acquired to measure unevenness of the object P.

That the lamps are turned on by the trigger signal and an image of the object must be taken at this time is because the captured image must acquired while turning on the lamps 400 for acquiring an image of a surface of the object to be measured.

For reference, image signal processor 207 receives the captured image and processes and outputs the captured image into an image signal to be displayed on a display 209, and a controller 203 the processed image signal to the image capturing device 205 when an image measuring start command is inputted from a data input device 201.

In the conventional optical shape measuring system having the configuration as described above, only a starting point and an ending point of driving the piezoelectric actuator are determined using a piezoelectric controller, after that, the piezoelectric actuator is driven at constant speed, the CCD camera captures and outputs images whenever the image capturing unit generates trigger signals, and the image capturing unit at the rear side thereof captures and transmits the images outputted from the CCD camera and generates the trigger signal again thereafter. Therefore, it takes a long time for acquiring an image frame.

Moreover, since the piezoelectric actuator controller and the camera for capturing an image are driven at constant speed, a driving error may occur according to the shape of the object P.

SUMMARY OF THE INVENTION

Therefore, the present invention has been made in view of the above and/or other problems, and it is an object of the present invention to provide an image measuring apparatus for measuring height information of an object to be measured using an image captured by an optical system in which a driving signal for controlling a piezoelectric actuator and a lamp that are driven whenever frames are captured is compensated and outputted such that a capturing interval between frames is adjusted and a method thereof.

It is a further object of the present invention to provide an image measuring apparatus for removing noise generated during the measurement and a high frequency component generated from an edge, and a method thereof.

In accordance with the present invention, the above and other objects can be accomplished by the provision of an apparatus for measuring height information of an object to be measured using an image captured by an optical system, the apparatus including: a CCD camera for capturing the object and outputting the captured image; a lamp for generating white light to illuminate a capturing area of the object; an illumination controller for controlling the lamp to be turned on; a piezoelectric actuator for controlling a minute height of the optical system with respect to the object; an image capturing device for acquiring the image captured by the CCD camera; a driving signal generator for outputting a driving signal to the illumination controller and the piezoelectric actuator when an enable signal is generated from the CCD camera; and an image signal processor for estimating height information of the object from data transmitted from the image capturing unit.

In accordance with the present invention, the above and other objects can be accomplished by the provision of a method of measuring height information of an object to be measured using an image captured by an optical system, the method including: detecting an enable signal from a CCD camera; generating a lamp controlling signal for turning on a lamp for generating white light to be projected on the object and a driving signal of a piezoelectric actuator whenever the enable signal is generated; acquiring an image outputted from the CCD camera; transmitting the image acquired from an image capturing unit to an image signal processor; obtaining maximum height data of a corresponding image frame by receiving the acquired image; repeating the detecting to the obtaining and determining whether the capturing of a scanning area of the object is finished or not after that; and acquiring a three-dimensional image using the obtained maximum height data.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DESCRIPTION OF THE PREFERRED EMBODIMENTS

The embodiments of the present invention will be described in detail with reference to accompanying drawings such that those skilled in the art may fully understand and achieve the concept of the present invention.

Figure 1:
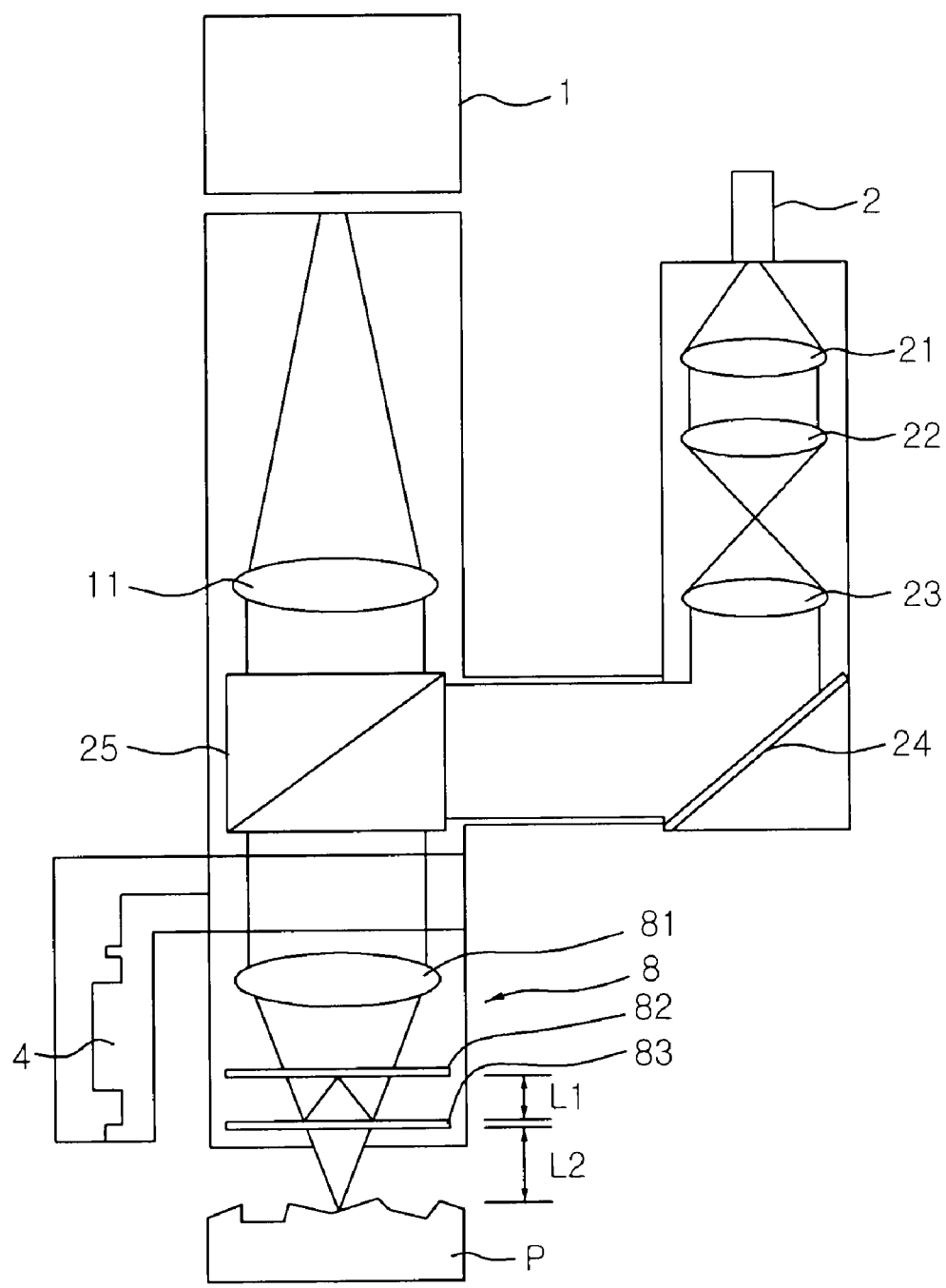
FIG. 1 is a schematic view illustrating a configuration of an image measuring apparatus according to the present invention.

FIG. 1 is a view illustrating a configuration of an optical system of an image measuring apparatus according to the present invention. A basic principle of a three-dimensional surface illuminance measuring method using WSI will be described with reference to FIG. 1 as follows. White light emitted from a lamp 2 enters an optical splitter 25 via a first lens 21, a second lens 22, a third lens 23, and a reflecting mirror 24, the white light reflected by the optical splitter 25 is focused by a lens 81, and the focused white light is projected on an object P to be measured via an optical splitter 83.

In the optical splitter 83 of an interferometer, the white light is split into a white light to be projected on the object P and a white light to be projected on a reference plane 82. The white light projected on the reference plane 82 is reflected by the reference plane 82 and enters the optical splitter 83 again. Meanwhile, the white light passing through the optical splitter 83 is reflected by the object P and enters the optical splitter 83 again. The optical splitter 82 combines the white light reflected by the reference plane 82 and the white light reflected by the object P in a same path again. At this time, due to a difference between a distance L1 from the reference plane 82 to the optical splitter 83 and a distance L2 from the optical splitter 83 to the object P, interference occurs. The white light in which the interference occurs passes through the optical splitter 25 and enters the CCD camera 1.

The CCD camera 1 captures the white light in which the interference occurs together with the object P. Here, a piezoelectric actuator 4 provided at a side of the interferometer moves a unit in which the optical splitter 83 is installed up and down to change the difference between the distances L1 and L2 such that the CCD camera finds a position where an interference signal is maximal from a position where the interference signal of the interference pattern entering the CCD camera is the strongest and a position where the interference signal of the interference pattern entering the CCD camera is the weakest to obtain a height of the object P at a specific position.

In the above-described way, a plurality of heights of a scanning area of the object P is obtained to measure unevenness of the object P.

Figure 2:
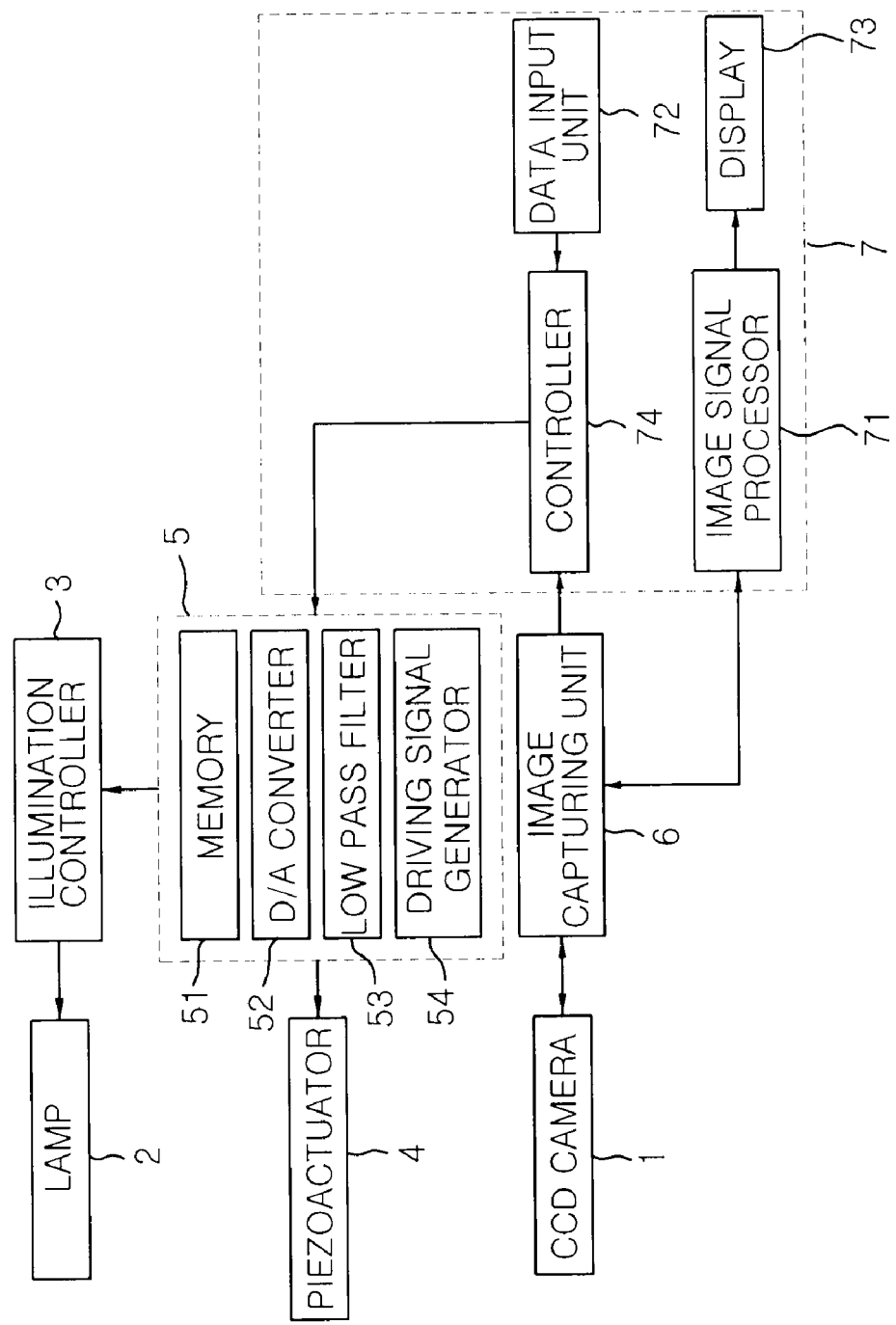
FIG. 2 is a block diagram illustrating the image measuring apparatus according to the present invention.

FIG. 2 is a block diagram illustrating the image measuring apparatus according to the present invention. The high rate image measuring apparatus according to the present invention includes a CCD camera 1 for capturing the image of the object P and outputting the captured image, a lamp 2 for generating white light to illuminate a capturing area of the object P, an illumination controller 3 for controlling the turning on of the lamp 2, a piezoelectric actuator 4 for controlling a minute height of an optical system with respect to the object P, an image capturing device 6 for acquiring a captured image through the CCD camera 1, a driving signal generator 5 for simultaneously outputting a driving signal to the illumination controller 3 and the piezoelectric actuator 4 when an enable signal is generated from the CCD camera 1, and an image signal processor 71 for estimating height information from data transmitted from the image capturing device 6.

The driving signal generator 5 includes a memory 51 for storing reference data necessary for the control of generating the driving signal, a digital-to-analog (D/A) converter 52, a low pass filter 53 for removing high frequency components from a signal outputted from the digital-to-analog converter 52 and a signal acquired by the image capturing device 6, and a driving signal generator 54 for generating a driving signal.

The D/A converter 52 is configured to reduce operating time of a computer, and the low pass filter 53 is configured to remove the noise generated during the measurement of height information of the object P and the high frequency components generated at the edges thereof.

Moreover, the driving signal generator 5 is configured to acquire operating time and operating height of the piezoelectric actuator 4 when the CCD camera 1 captures an image frame and to output compensated driving signals for driving the piezoelectric actuator 4 and for controlling the lamp when capturing a next image frame every frame. Therefore, the accuracy of the acquired image can be enhanced.

Figure 3:
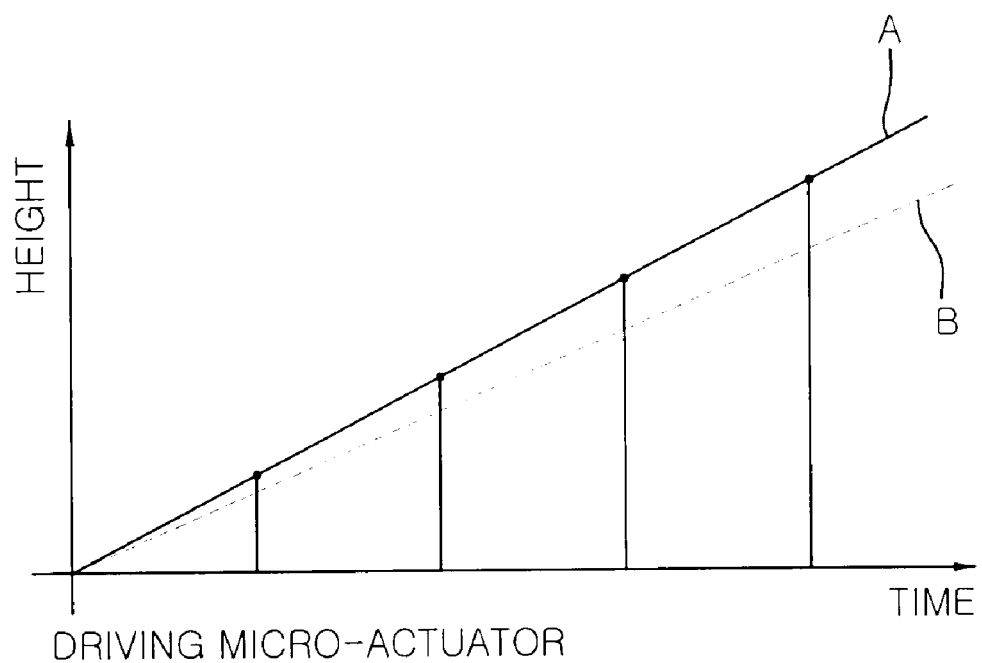
FIG. 3 is a graph illustrating operating time of a micro-driving unit of a micro-actuator of the image measuring apparatus according to an embodiment of the present invention.

For example, as shown in FIG. 3, the driving signal generator 5 is configured to compensate data for controlling the operating time and a height of the piezoelectric actuator and the lamp when capturing the next image frame if information about the operating time and the height of the piezoelectric actuator is different from reference data when capturing a first image frame by comparing the reference data A with measured data B and to generate a driving signal using the compensated data.

The image signal processor 71 receives the captured image and converts the same into an image signal to be displayed on a display 73 to output the image signal, and a controller 74 transmits an image measurement start command to the driving signal generator 5 when the image measurement start command is inputted from a measurer to the controller 74 via a data input unit 73.

Figure 4:
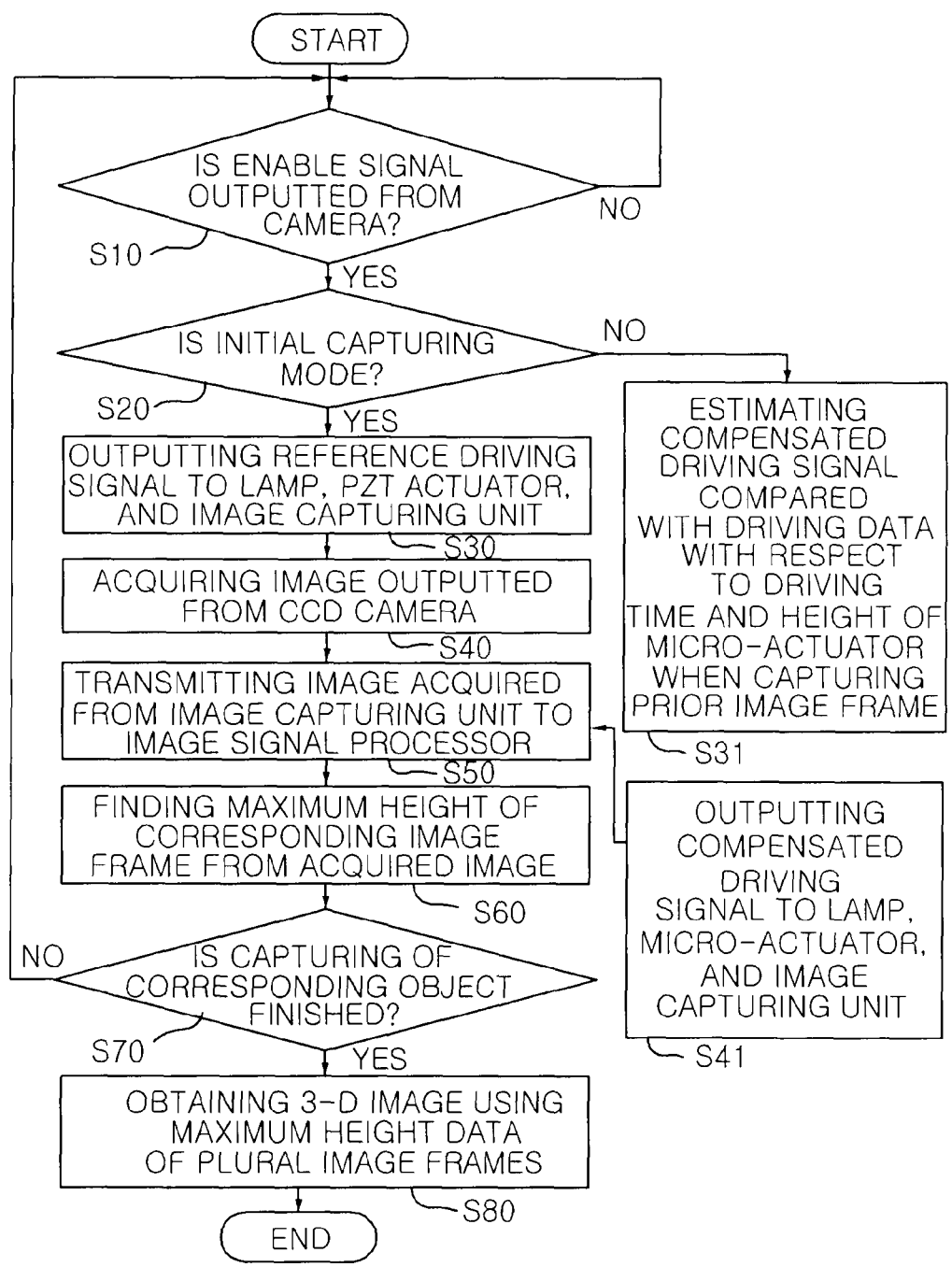
FIG. 4 is a flowchart illustrating an image measuring method according to the present invention.
Figure 5:
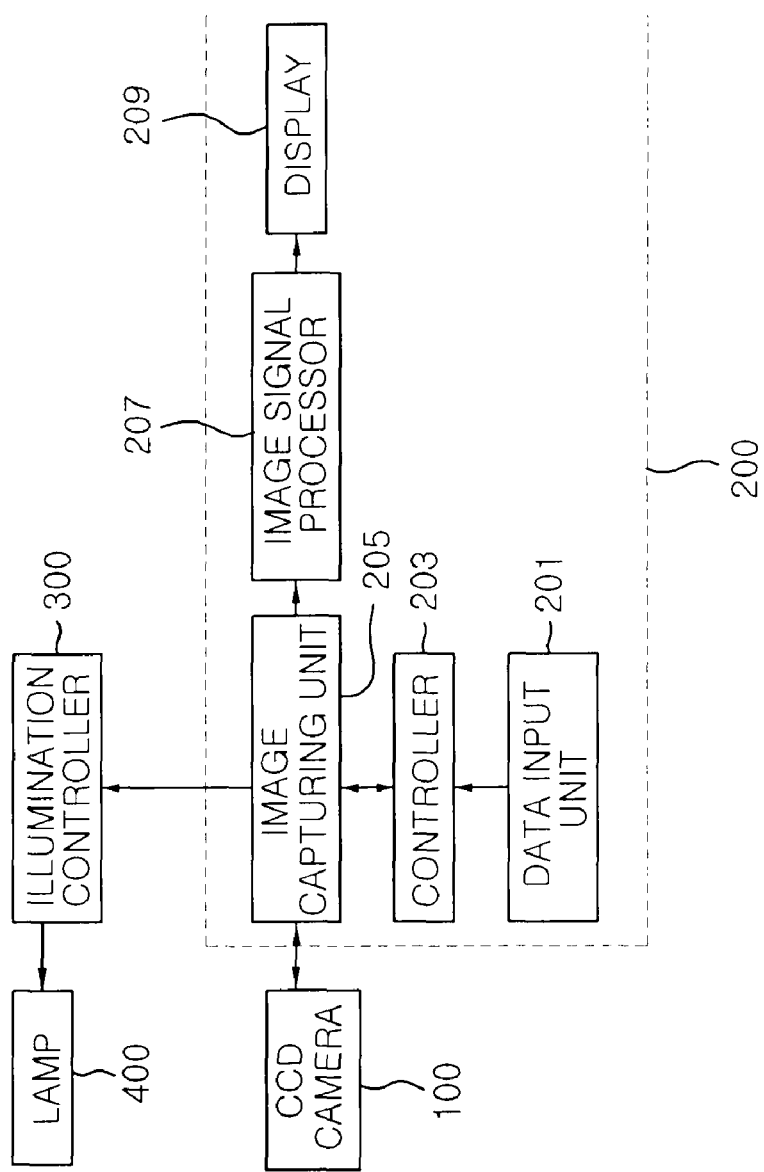
FIG. 5 is a block diagram illustrating a process of acquiring an image in a conventional optical shape measuring apparatus.

FIG. 4 is a flowchart illustrating an image measuring method according to the present invention. A method of measuring height information of an object to be measured using an image captured by an optical system, includes detecting a frame enable signal from the CCD camera (S10); generating an illumination control signal for turning on white light to be projected on the object and a driving signal of a piezoelectric actuator whenever the frame enable signal is detected (S30); acquiring an image outputted from the CCD camera (S40); transmitting the image acquired from the image capturing unit to the image signal processor (S50); receiving the acquired image to acquire maximum height data of a corresponding image frame (S60); determining whether the capturing of a scanning area of the object is finished or not after repeating the steps of S10 to S60; and acquiring a three-dimensional image using the acquired maximum height data (S80).

At this time, the method further includes determining whether a mode is an initial capturing mode prior to the step of generating the driving signal, generating the driving signal using the reference data stored in the memory when the mode is determined to be the initial capturing mode as a result of the determination (S31), and acquiring driving data of the piezoelectric actuator at a time of capturing a directly prior frame when the mode is determined to be not the initial capturing mode as a result of the determination so as to estimate a compensated driving signal for controlling the piezoelectric actuator by comparing the driving data with the reference data stored in the memory and to output the compensated driving signal to capture a next image frame according to the compensated driving signal (S41).

As described above, the present invention acquires driving information of the micro-actuator when capturing the image frame and compares the acquired driving information with the reference information. If the acquired driving information is not identical to the reference information, the compensated driving signal for controlling the piezoelectric actuator and the lamp at a time of capturing the next image frame is estimated and outputted to adjust the capturing interval between the image frames so that the accuracy of the acquired image can be enhanced.

Moreover, the D/A converter is provided in the driving signal generator to reduce the operating time of the computer and the low pass filter is provided to remove noise generated when measuring the image of the object and the high frequency components generated at the edges thereof so that the precision of the acquired image can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring height information of an object to be measured using an image captured by an optical system, the apparatus comprising:
   a CCD camera for capturing the object and outputting the captured image;
   a lamp for generating white light to illuminate a capturing area of the object;
   an illumination controller for controlling the lamp to be turned on;
   a piezoelectric actuator for controlling a minute height of the optical system with respect to the object;
   an image capturing device for acquiring the image captured by the CCD camera;
   a driving signal generator for outputting a driving signal to the illumination controller and the piezoelectric actuator when an enable signal is generated from the CCD camera; and
   an image signal processor for estimating height information of the object from data transmitted from the image capturing unit,
   wherein the driving signal generator comprises:
   a memory for storing reference data necessary for the control of generating the driving signal;
   a digital-to-analog converter;
   a low pass filter for removing high frequency components from a signal outputted from the digital-to-analog converter and a signal acquired by the image capturing device; and
   a driving signal generator for generating a driving signal.

2. The apparatus for measuring height information of an object to be measured according to claim 1, wherein the driving signal generator is configured to acquire an operating time and driving height information of the piezoelectric actuator when the CCD camera captures an image frame, to estimate driving signal data compensated by comparing the acquired data with reference data, and to output the compensated driving signal when capturing a next image frame.

3. A method of measuring height information of an object to be measured using an image captured by an optical system, the method comprising:
   detecting an enable signal from a CCD camera;
   generating a lamp controlling signal for turning on a lamp for generating white light to be projected on the object and a driving signal of a piezoelectric actuator whenever the enable signal is generated;
   acquiring an image outputted from the CCD camera;
   transmitting the image acquired from an image capturing 5 unit to an image signal processor;
   obtaining maximum height data of a corresponding image frame by receiving the acquired image;
   repeating the detecting to the obtaining and determining whether the capturing of a scanning area of the object is finished or not after that; and
   acquiring a three-dimensional image using the obtained maximum height data.

4. The method of measuring height information of an object to be measured according to claim 3, further comprising:
   determining whether a mode is an initial capturing mode or not prior to the step of generating the driving signal;
   generating the driving signal using reference data stored in a memory when the mode is determined to be the initial capturing mode as a result of the determination;
   comparing driving data of a micro-actuator at a time of capturing a directly prior image frame with the reference data stored in the memory when the mode is determined to be not the initial capturing mode as a result of the determination, and estimating a compensated driving signal for controlling the piezoelectric actuator; and
   outputting the compensated driving signal to capture a next image frame according to the compensated driving signal.

* * * * *